Sept. 19, 1961 MASASUKE MORITA ET AL 3,001,068

F.M. RECEPTION SYSTEM OF HIGH SENSITIVITY

Filed July 15, 1958 3 Sheets-Sheet 1

Inventors
M. MORITA, S. ITO
By [signature]
Attorney

Inventors
M. MORITA, S. ITO
By [signature]
Attorney

Sept. 19, 1961 MASASUKE MORITA ET AL 3,001,068

F.M. RECEPTION SYSTEM OF HIGH SENSITIVITY

Filed July 15, 1958 3 Sheets-Sheet 3

Inventors
M. MORITA, S. ITO
By
Attorney

United States Patent Office 3,001,068

Patented Sept. 19, 1961

3,001,068

F.M. RECEPTION SYSTEM OF HIGH SENSITIVITY

Masasuke Morita and Sukehiro Ito, Minato-ku, Tokyo, Japan, assignors to Nippon Electric Company Limited, Tokyo, Japan, a corporation of Japan Filed July 15, 1958, Ser. No. 748,748
Claims priority, application Japan Aug. 12, 1957
10 Claims. (Cl. 250—20)

This invention relates to frequency modulation receivers of high sensitivity.

An object of the invention is to increase the signal-noise ratio of an FM receiver without increasing the FM transmitter power.

Another object of the invention is to make an FM receiver sensitive and responsive to weak signals by raising the signal amplitude without thereby raising the noise level.

Another object of the invention is to make an FM receiver sensitive to weak signals by injecting a local sinusoidal voltage of like frequency and larger amplitude, and concomitantly prevent any distortion arising from the injected voltage.

A feature of the invention is a sensitive FM receiver, wherein a sinusoidal voltage wave of larger amplitude and equal frequency is injected ahead of the demodulator to be combined with the FM signal wave.

Another feature of the invention is a sensitive FM receiver wherein the injected sinusoidal voltage aforementioned is locked in phase automatically with that of the FM wave at all times.

Another feature of the invention is a sensitive FM receiver wherein FM negative feedback is provided after the demodulator to reduce distortion arising from the aforementioned injected sinusoidal wave of large amplitude.

One way of insuring stability of communications with a favorable signal-to-noise ratio even with small input voltages is to increase the signal sensitivity of radio receivers. The advantages derived from such sensitive receivers is an increase in communicable range and reliability, a reduction in transmitting power, and the like.

The importance of sensitive receivers has been enhanced with the recent development of the "Over the Horizon" propagation of radio waves in the ultra-high-frequency range and microwave bands.

According to this invention, FM receivers are enabled to provide stable and dependable communications with a favorable channel signal-to-noise ratio even at small input power.

This is accomplished by combining with the received signal a sinusoidal voltage of the same frequency but of larger amplitude than said signal ahead of the demodulator, thus preventing the demodulation from being interfered with by noise at a sufficiently small input, and further, by applying modulation to the local oscillator with the signal output of the demodulator so that FM negative feedback may be performed to improve thereby the signal-to-noise ratio and at the same time, to relieve distortion that otherwise would be produced by the aforementioned combination.

The above-mentioned operation will now be described in detail in conjunction with the attached drawings, wherein FIGURE 1 shows the relationship between reception input power and channel signal-to-noise ratio of a conventional FM receiver;

Figure 1:
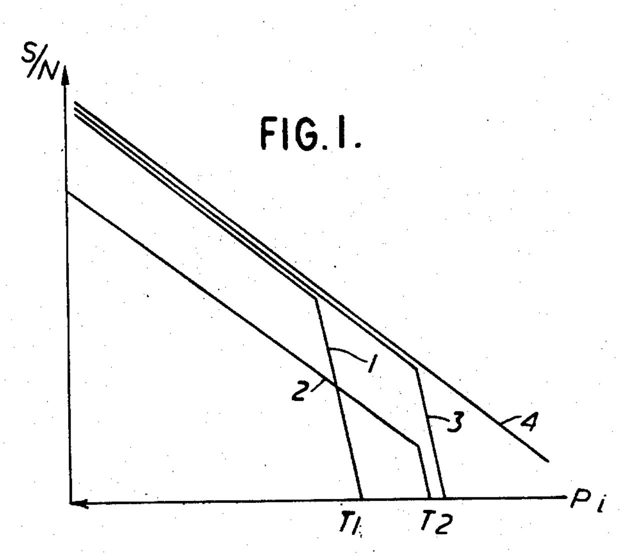
FIG. 1 shows characteristic curves illustrating the effect of FM reception system of high sensitivity in accordance with this invention.

In FIG. 1, the input power is taken as the abscissa, said power being decreased towards the right-hand direction, while the signal-to-noise ratio is taken as the ordinate.

Curve 1 shows the characteristics of a conventional wide-band FM receiver. It will be seen from this curve that the channel signal-to-noise ratio varies in proportion to the reception input power while said power is comparatively large, whereas said ratio abruptly drops upon said reception power being decreased. When the threshold power is $T_1$, there results an interruption of communication. This phenomenon is caused by the fact that the operation of the FM receiver's amplitude limiter is interfered with by noise overriding the signal.

Although it is possible, by narrowing the band width of the IF amplifier and hence, increasing the sensitivity of a receiver, to improve the threshhold level from $T_1$ to $T_2$ as shown by the characteristic curve 2 in FIG. 1, this will cause the signal-to-noise ratio for the case of high electric field intensity to be sacrificed, since to narrow the bandwidth means to lessen the frequency deviation for the frequency-modulated wave.

To solve this difficulty, a method for decreasing the bandwidth of an intermediate frequency amplifier by applying the demodulator output to frequency-modulate the local oscillator by performing FM negative feedback, has been proposed, as for example in U.S. Patent 2,075,503 issued March 30, 1937, to J. G. Chaffee. With this method, it is true that, as shown by curve 3 in the figure, the threshold level can be improved without impairing the signal-to-noise ratio when the receiving input power is sufficient, but improvement of said level by a large margin can scarcely be expected because of restrictions existing between the amount of negative feedback and the band-width of the intermediate-frequency amplifier that originate from circuit construction from the viewpoint of stability of the negative feedback circuit.

According to the present improvements, as illustrated in curve 4, when a sinusoidal wave of large amplitude and the same frequency as the FM carrier wave is combined with the received signal before it is demodulated, it prevents the function of amplitude limiter from being disturbed by the noise. At the same time, it would eliminate the existence of a threshold power, that normally disables the conventional equipment to communicate, if the input power should be weaker than that threshold. Therefore, it is possible with these improvements to maintain favorable values of signal-to-noise ratio when the reception input power is large, as its characteristic curve 4 in FIG. 1 shows, and prevent said ratio from rapid deterioration even if the reception input power is enfeebled.

Figure 2:
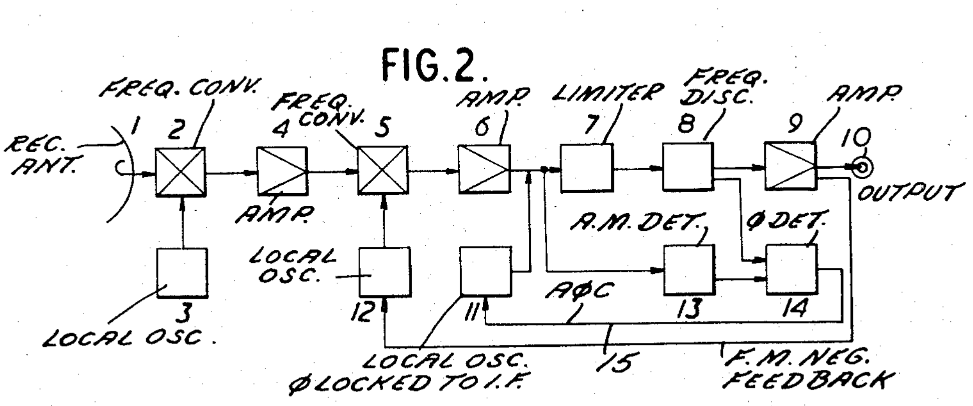
FIGURE 2 shows a block diagram for one embodiment of the FM receiver of high sensitivity in accordance with this invention.

FIG. 2 shows a block diagram for an embodiment of a receiver of high sensitivity according to this invention. In this figure, 1 denotes the receiving antenna; 2 and 5 the first and second frequency converters, respectively; 3 the first local oscillator; 4 and 6 the first and second I-F amplifiers, respectively; 7 amplitude limiter; 8 frequency discriminator; 9 baseband amplifier; 10 output terminal of the receiver; 11 oscillator of the same frequency as the carrier contained in the second I-F signal; 12 second local oscillator capable of applying frequency modulation; 13 detector for detecting amplitude modulation; 14 denotes the control circuit for controlling the phase of oscillator 11 by comparing the output of frequency discriminator 8 with that of detector 13.

The received signal from antenna 1 will first be amplified to a sufficient voltage by amplifier 4 after its frequency has been converted to the first intermediate frequency by the first frequency converter 2 and then will be converted to the second I-F signal by being modulated with the second local oscillator frequency available from the second local oscillator 12.

This second local oscillator frequency will be frequency-modulated by the receiver output 10 obtained after the second I-F signal has passed through the frequency discriminator 8 and baseband amplifier 9, so as to follow the frequency deviation for the first I-F signal—that is, the method of FM negative feedback is applied, with the result that the frequency deviation for the second I-F signal is greatly decreased as compared to that for the received signal.

The second I-F signal after having been amplified to a certain level by amplifier 6, will be combined with a sinusoidal wave from oscillator 11 whose amplitude is larger than that of the second I-F signal and whose frequency is the same as the carrier contained therein while its phase has been suitably controlled, before entering into the amplitude limiter 7.

Therefore it is possible to prevent the channel signal-to-noise ratio from deteriorating excessively by restoring the operation of amplitude limiter 7 to normal even in cases where said ratio is extremely bad and communication is impracticable by conventional reception systems, i.e. when the reception power is extremely small and the peak value of signal in the output of amplifier 6 is less than that of noise, and hence, the amplifier limiter would be operated by the noise level.

As is well known, a frequency modulated wave is obtained by maintaining constant the amplitude and phase of a carrier wave while varying its frequency by means of a signal current, the frequency deviation conventionally being limited to approximate 75 kc. on both sides of a center frequency. The loudness or intensity of the signal determines the deviation. The signal pitch or frequency determines the rate at which modulation takes place. It will be appreciated that it would practically be impossible to construct a vector diagram illustrating all of the frequencies resulting from modulation by a voice signal. The vector $\overline{OA}$ of FIG. 3 represents only the carrier current component of the F-M signal as it appears at the output of the I-F amplifier.

The phase of vector $\overline{OA}$ may be considered an unvarying except for those variations due to changes in circuit constants and the like. On the other hand the vectors $\overline{AB}$ or $\overline{AC}$ representing noise voltages are of a random nature and may occur at any phase angle relative to the signal vector. After adding the signal and noise voltage vectors and limiting the resultants, it will be seen that, when the signal voltage exceeds that of the noise, the vector representation appears as vectors $\overline{OM}$, $\overline{OD}$ and $\overline{ON}$ in FIG. 3. The maximum phase variation of a resultant voltage from the signal voltage due to the noise is plus or minus the angle DON in the illustrated example. On the other hand, when the noise exceeds the signal (vector $\overline{AC}$ greater than vector $\overline{OA}$), the amplitudes of the resultant vectors will vary between OJ and OG while their phases will rotate about the center O. After passing through the limiter 7, the amplitudes will become constant with time but the phase relations will remain as they were before limiting. This condition is represented by vectors $\overline{OH}$, $\overline{OM}$, $\overline{OD}$ and $\overline{ON}$ which show the noise as represented by a vector that rotates completely around the center O. The phase variation is not necessarily limited to 360° but could be many times that value.

Since the noise output, after passing through the demodulator, is proportional to the phase rotation angle, it will be obvious that it may become extremely large as compared to the case in which the noise voltage is less than the signal voltage. Furthermore, there is no definite ratio between the amplitude of the signal and the amplitude of the noise since the amount of phase rotation of the latter is indeterminate. When the amplitude of the signal is greater than that of the noise the phase variation of the noise is less than 360° and a ratio can be determined in this case, the ratio becoming smaller the lesser the noise voltage with respect to the signal voltage.

Figures 3, 4:
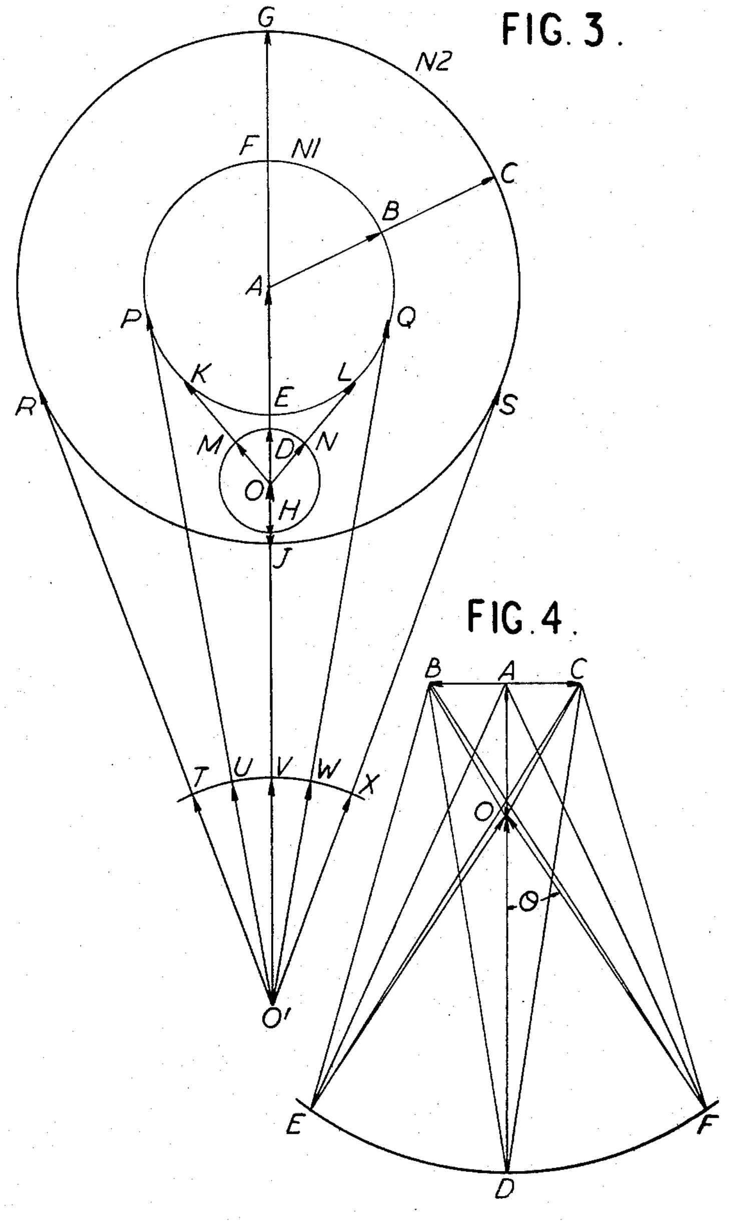
FIGURE 3 shows a vector diagram illustrating the operation of the amplitude limiter for the embodiment of FIG. 2.
FIGURE 4 shows another vector diagram illustrating the operation of the automatic phase control circuit for the embodiment of FIG. 2.

Suppose, still referring to FIG. 3, a case where the amplitude of noise is equal to the length represented by $\overline{AB}$ in the figure. In this case, since the relative phase relationship between the noise and signal is varying irregularly, the noise may be represented by a vector with its tip moving on the circumference N1 of a circle of radius $\overline{AB}$ and its origin at A, or center of said circle. Therefore the tip of the resultant vector of signal and noise will move along the circumference N1, of a circle with a center of the origin O of said vector, while its amplitude will vary between OE and OF, the phase varying between OK and OL.

When the resultant voltage of the signal and noise passes through amplitude limiter 7, the amplitude will become constant with time, the phase being retained as it was. This state may be expressed by the three vectors $\overline{OM}$, $\overline{OD}$ and $\overline{ON}$ in the figure. Consequently the magnitude of noise output available after the resultant voltage has passed through the demodulator will be proportional to angle DON.

Because of this phenomenon, as is indicated in FIG. 1, the channel signal-to-noise ratio will become directly proportional to the reception input power where it is sufficiently large.

With a decrease of reception input power, the amplitude of noise signal will be increased relatively as compared to that of signal voltage because the noise voltage is constant. Suppose now, that the reception input voltage is halved as compared to that in the previous case.

If the signal vector is represented by $\overline{OA}$ in FIG. 3, the noise will be represented by a vector of which the tip moves along the circumference N2 of a circle with center at the origin A of said vector whose radius is twice as large as that of the aforementioned circle. Therefore, the resultant vector of the signal and noise will rotate about the center O, the tip being on the circumference N2. The amplitude of resultant vector will vary between OJ and OG while the phase will rotate about the center O many times.

Upon the resultant voltage of the signal and noise being passed through the amplitude limiter 7, the amplitude only will become constant with time, the phase being retained as it was. As shown by the vectors $\overline{OH}$, $\overline{OM}$, $\overline{OD}$ and $\overline{ON}$, said resultant voltage, being affected by the noise, will be represented by a vector that rotates about the center O many times. Since the output available by passing through the demodulator is proportional to this phase rotation angle, it will become extremely large as compared to the previous case.

As will be apparent from the drawing, an abrupt increase in output of the demodulator will take place when the magnitude of noise has exceeded that of signal. This is the very reason why the threshold level exists with the conventional receivers as shown in FIG. 1 and incapability of communication results with abrupt deterioration of the channel signal-to-noise ratio where the reception input becomes small.

With the present system, however, since a sinusoidal signal voltage will be combined with reception signal ahead of the amplitude limiter, the composite signal to be applied to said amplitude limiter in cases where the reception input power is large and the locus of the tip of noise vector is expressed by the circumference N1, will be represented by a vector whose origin is at O′ and whose tip is on the circumference N1 of a circle. Therefore the output of the amplitude limiter will be represented by a vector whose magnitude is $\overline{O'U}$, $\overline{O'V}$ or $\overline{O'W}$ and whose phase varies between $\overline{O'U}$ and $\overline{O'W}$. As a result, the magnitude of the demodulated output, will be proportional to angle VO′U.

Consequently, even if the tip of the noise vector moves on the circumference N2 with a decrease in reception input power—that is, even if communication fails with a conventional receiver as described previously with an excessively increased noise in the demodulator output, the resultant signal will be represented by a vector whose origin is at O′ and the tip on the circumference N2, with the result that the amplitude of the limiter output will become constant as shown by $\overline{O'T}$, $\overline{O'V}$ and $\overline{O'X}$ while the phase will vary between $\overline{O'T}$ and $\overline{O'X}$, the magnitude of the demodulator output being expressed by angle VO′T. Thus excessive increase in noise that otherwise would be produced may be avoided.

In short, when the sinusoidal voltage vector $\overline{O'O}$ to be combined with the reception input signal is taken sufficiently large as in the system according to the invention, the threshold level would not be present or become a problem as in conventional receivers. In other words, communication failure due to abrupt deterioration of the channel signal-to-noise ratio is prevented in cases where the receiver power becomes extremely small.

It may be anticipated that quality of communication would be impaired excessively beyond tolerable limits with the production of large distortion if a sinusoidal wave of large amplitude having the same frequency as the carrier contained in the FM waves is applied as described. However, maintenance of high quality of communication does become possible in accordance with the present invention by the combination of the FM negative feedback for the following reasons: First, the phase difference between the second intermediate frequency signal waves and a sinusoidal wave, having the same frequency as that of the carrier contained in the intermediate frequency signal wave, is reduced sufficiently to substantially eliminate phase distortion, e.g. 1 radian; secondly, even with the FM negative feedback, distortion produced in the feedback loop will be improved by the amount of feedback just in the same manner as with general feedback circuits at low frequencies; thirdly, as will be explained later referring to an example, the use of an automatic phase control circuit which operates to maintain the carrier contained in the reception signal approximately in phase with the sinusoidal wave having the same frequency as the carrier, maintenance of favorable communication quality has become possible.

The received signal combined with the sinusoidal signal will be demodulated in passing through amplitude limiter 7 and frequency discriminator 8 and then derived from output terminal 10 via baseband amplifier 9 as the receiver output. In this case, as has been stated previously, a part of the receiver output will be fed back over path 15 to the second local oscillator 12 so as to provide FM negative feedback.

On the other hand, any amplitude-modulated component of the reception signal which has been combined with the sinusoidal voltage will be detected by detector 13 prior to entering the amplitude limiter 7. If frequency modulation at a particular frequency $F_1$ (hereinafter referred to as the pilot frequency) has been applied to either the transmitter (not shown), coupled with the receiver or local oscillators 3 or 13 in advance, an output of frequency $F_1$ having constant amplitude and phase will be obtained from the frequency discriminator 8 at all times, whereas the amplitude of the signal of frequency $F_1$ available from the amplitude detector 13 will be proportional to the difference in phase between the sinusoidal output of oscillator 11 and the carrier contained in the reception signal at the second intermediate frequency and its polarity will change in accordance with that of phase difference between the two waves.

FIG. 4 shows a vector diagram illustrating this relationship, in which vector $\overline{OA}$ represents the carrier component contained in the reception signal. Therefore, the reception signal vector at the pilot frequency $F_1$ will oscillate about the origin O, the other end moving back and forth on a line connecting points B, A and C. When this reception signal vector is combined with the sinusoidal voltage $\overline{DO}$ which is in phase with the carrier component $\overline{OA}$, the resultant vector will rotate about the origin D, the other end moving back and forth on the line connecting points B—A—C. Since $\overline{DB}$ equals $\overline{DC}$, however, the amplitude-modulated component at the pilot frequency will not be produced. In cases where a sinusoidal wave vector OF which differs in phase by $\theta$ from the vector OA of the carrier contained in the reception signal is added, it will be seen that, although the locus of tip of the resultant vector remains unchanged, the origin will shift to F. This will cause a difference in length between $\overline{BF}$ and $\overline{CF}$, and an amplitude-modulated component at the pilot frequency to be produced.

It will also be evident from the drawing that the degree of modulation is approximately proportional to the difference in phase $\theta$ between the carrier in the reception signal and the sinusoidal voltage.

Where the polarity of the phase difference is reversed, the origin of the resultant vector will move to E, with the result that the phase of the produced amplitude-modulated component will be reversed.

Consequently it is possible that, where phase detection is performed by comparing the phase of the output component of the pilot frequency obtained from detector 13 with that of the pilot frequency contained in the output of frequency discriminator 8, the phase of the sinusoidal voltage from oscillator 11 may be controlled, thereby maintaining said phase in conformance with the phase of the carrier contained in the reception signal.

Figure 5:
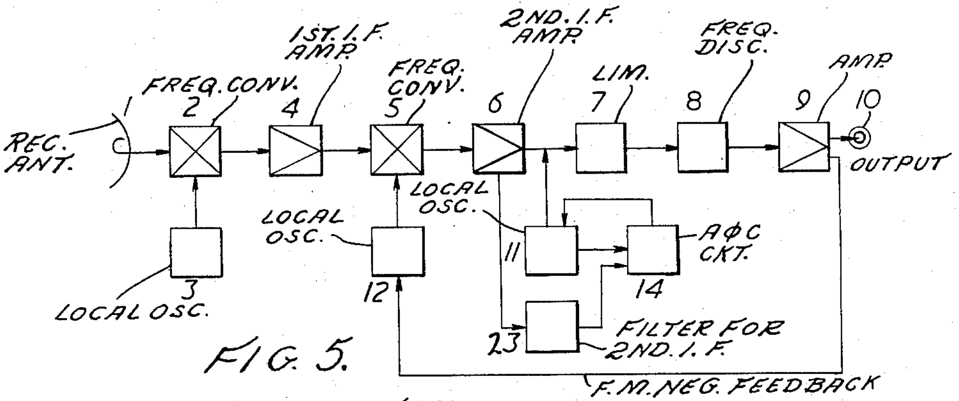
FIGS. 5, 6 and 7 show block diagrams for other embodiments of high sensitivity FM reception system in accordance with this invention.

FIG. 5 shows a block diagram for another embodiment, with a different automatic phase control circuit for use with the FM reception system of high sensitivity in accordance with this invention. In this figure, the numerals 1 to 12 inclusive are used to denote the identical parts as in FIG. 2 while 23 denotes a band-pass filter intended to derive the carrier signal only contained in the second I-F signal. 14 denotes the automatic phase control circuit for controlling the output of oscillator 11 in such a manner as to maintain a particular phase difference by comparing the phase of the output of band-pass filter 23 with that of oscillator 11. By use of this circuit it is possible to maintain the carrier contained in the reception signal at the output of the second I-F amplifier 6 automatically in phase with the sinusoidal voltage derived from the oscillator 11 which will be combined with said carrier. On this account, the distortion can be minimized as stated previously and favorable quality of communication is insured at all times.

Figure 6:
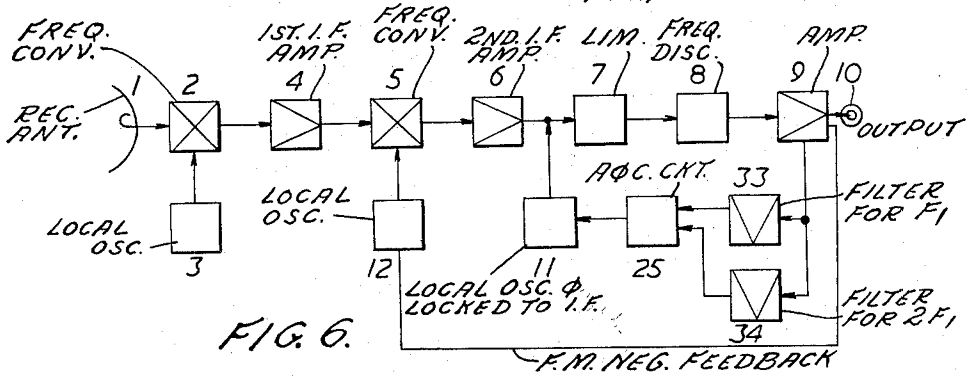

FIG. 6 shows a block diagram for a further embodiment, including an automatic phase control circuit for use with the high-sensitivity FM reception system in accordance with this invention, wherein the numerals 1 to 12 inclusive are used to denote the same parts as those in FIG. 2. 33 and 34 denote band-pass filters for permitting the pilot frequency $F_1$ and twice that frequency to pass, respectively, while 25 is the automatic phase control circuit for comparing the two outputs of the above-mentioned band-pass filters and controlling the phase of the sinusoidal output of oscillator 11 by means of said outputs.

The magnitude of the second higher harmonic of pilot frequency $F_1$ in the output of frequency discriminator 8 will be proportional to the difference in phase between the sinusoidal output of the oscillator 11 and the carrier component contained in the reception signal while its polarity changes with the polarity of said difference in phase. Therefore, when phase detection is performed by comparing the second higher harmonic component of the pilot frequency which is the output of filter 34 with the pilot frequency ($F_1$) component in the output of filter 33 and phase control is established for the sinusoidal output of oscillator 11, said sinusoidal output voltage can be maintained in phase with the carrier in the reception signal at all times.

Figure 7:
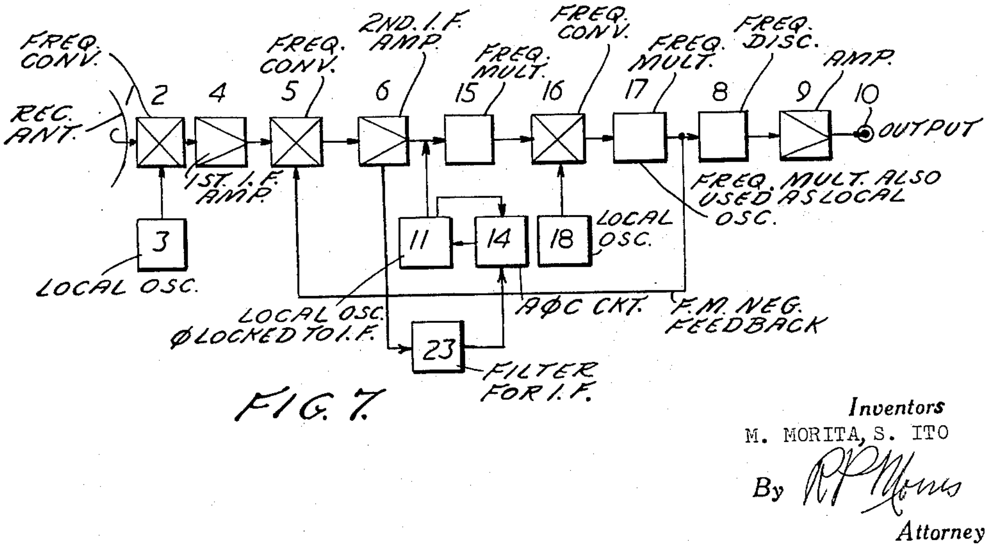

FIG. 7 shows a block diagram for still another embodiment in which numerals 1 through 11 together with 23 and 14 are used in the same manner as in FIG. 5. In FIG. 7, the numerals 15 and 17 denote frequency multipliers and 16, 18 denote the frequency converter and local oscillator, respectively.

In lieu of using a second local oscillator, 12 as in FIG. 5, the second I-F signal frequency is directly multiplied by the frequency multiplier 15 and then converted to a lower frequency by frequency converter 16 and local oscillator 18 and further the converted frequency is multiplied by multiplier 17, then used as the second local frequency. The FM negative feedback is accomplished by use of such a circuit for decreasing the frequency deviation.

Thus the receiver output signal will be available from output terminal 10 when a part of the output frequency of frequency multiplier 17 is demodulated by frequency discriminator 8 and amplified by the baseband amplifier 9. In such a manner, the demodulation may be performed where the frequency deviation is large, and the demodulation operation is featured by an advantage against the noise produced in frequency discriminator 8 and baseband amplifier.

It should be understood that whereas the invention has been illustrated in connection with microwave and ultrahigh frequency receivers, and whereas it could be particularly applicable to the "Over the Horizon" form of propagation, the principles of the invention are more general than these applications suggest and could be applied likewise to FM carrier and FM communication systems in a manner known to those skilled in the art to which the invention pertains.

What is claimed is:

1. A receiving system of high sensitivity for receiving and recovering the signal from a frequency modulated wave in the presence of interfering random noise comprising: means for translating the received waves on which waves representing said random noise is superimposed to waves of intermediate frequencies, said means including a first local oscillator; a source of local oscillations having a frequency equal to that of the carrier component of said intermediate frequency waves, the amplitude of said local oscillations having a minimum predetermined value; means for combining said intermediate frequency waves and said local oscillations; means for maintaining substantially constant the phase difference between the carrier component of the intermediate frequency waves and said local oscillations; means for limiting the amplitude of said combined waves and oscillations and discriminator means connected to said limiting means for reproducing said signal.

2. A receiving system according to claim 1 wherein the means for maintaining substantially constant the phase difference between the intermediate frequency waves and said local oscillations comprises further means whereby said phase difference is substantially zero.

3. A receiving system in accordance with claim 2 further comprising a negative feedback connection between said discriminator means and said first local oscillator for reducing the frequency deviation of said intermediate frequency waves and the distortion products of modulation resulting from the combination of said intermediate frequency waves and said local oscillations.

4. A receiving system according to claim 3 in which the minimum value of the amplitude of said local oscillations is greater than the amplitude of said intermediate frequency waves.

5. A receiving system according to claim 3 in which the amplitude of said local oscillations is greater than those of said noise.

6. A receiving system according to claim 3 in which the output of said limiting means is maintained at a predetermined value dependent on the amplitude of the local oscillations.

7. A receiving system according to claim 3 in which said means for maintaniing substantially constant the phase difference between the carrier component of the intermediate waves and the local oscillations further comprises; means for frequency modulating the intermediate frequency carrier waves with a pilot frequency; means for recovering said pilot frequency from said discriminator, said recovered frequency having a constant amplitude and phase; means for detecting the amplitude variations of said pilot frequency from said intermediate frequencies before the latter passes through said limiting device; phase detecting means for comparing the phase of the recovered pilot frequency with the phase of the pilot frequency whose amplitude has been detected to obtain a control voltage and means for applying said control voltage to said source of local oscillations to maintain said phase difference substantially zero.

8. A receiving system according to claim 3 in which said means for maintaining substantially constant the phase difference between the carrier component of the intermediate waves and the local oscillations further comprises; a phase detector, means for applying said local oscillations and the carrier component of said intermediate frequency waves to said phase detector, and means for connecting the output of said phase detector to said source of local oscillations to maintain said phase difference substantially zero.

9. A receiving system according to claim 3 in which said means for maintaining substantially constant the phase difference between the carrier component of the intermediate waves and the local oscillations further comprises; means for frequency modulating the intermediate frequency carrier waves with a pilot frequency; means for recovering from said discriminator waves having the frequency of, and twice the frequency of, said pilot wave, and phase control means for comparing said two recovered waves and for controlling the phase of the local oscillations to maintain said phase difference substantially zero.

10. A receiving system in accordance with claim 2 further comprising a negative feedback connection for applying the signal reproduced by said discriminator means to said first local oscillator whereby the frequency deviation of said intermediate frequency signal waves is reduced to an amount such that the maximum phase deviation between said intermediate frequency waves and the waves of said source of local oscillations substantially eliminates phase distortion.

References Cited in the file of this patent

UNITED STATES PATENTS

| | | |
|---|---|---|
| 2,075,503 | Chaffee | Mar. 30, 1937 |
| 2,138,746 | Robinson | Nov. 29, 1938 |
| 2,488,585 | Corrington | Nov. 22, 1949 |
| 2,725,422 | Stark | Nov. 29, 1955 |
| 2,775,646 | Grosjean | Dec. 25, 1956 |
| 2,801,332 | Vos | July 30, 1957 |
| 2,828,412 | Jager et al. | Mar. 25, 1958 |

FOREIGN PATENTS

| | | |
|---|---|---|
| 480,847 | Great Britain | Mar. 1, 1938 |
| 663,664 | Great Britain | Dec. 27, 1951 |

OTHER REFERENCES

Article: Exalter-Carrier Amplitude and Phase Modulation Reception, by Crosby, Proceedings Institute of Radio Engineers, September 1945, pages 581 to 591.